US012797895B2

(12) United States Patent
Jeong et al.

(10) Patent No.: US 12,797,895 B2
(45) Date of Patent: Nov. 17, 2026

(54) APPARATUS FOR SUPPLYING CHEMICALS, APPARATUS AND METHOD FOR TREATING SUBSTRATE

(71) Applicant: SEMES CO., LTD., Chungcheongnam-do (KR)

(72) Inventors: In Yong Jeong, Chungcheongnam-do (KR); Mu Hyeon Lee, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 269 days.

(21) Appl. No.: 18/351,705

(22) Filed: Jul. 13, 2023

(65) Prior Publication Data

US 2024/0216942 A1 Jul. 4, 2024

(30) Foreign Application Priority Data

Dec. 28, 2022 (KR) ........................ 10-2022-0188026

(51) Int. Cl.

*B05C 11/10* (2006.01)
*B05C 5/00* (2006.01)
*B05C 5/02* (2006.01)

(52) U.S. Cl.

CPC .......... *B05C 11/1036* (2013.01); *B05C 5/001* (2013.01); *B05C 5/0208* (2013.01); *B05C 5/0225* (2013.01); *B05C 11/1002* (2013.01); *B05C 11/1042* (2013.01)

(58) Field of Classification Search

None

See application file for complete search history.

(56) References Cited

U.S. PATENT DOCUMENTS 5,462,207 A * 10/1995 Daraktchiev ............ B01J 4/001 141/91
6,136,362 A * 10/2000 Ashton .................... A23B 2/46 99/453

(Continued)

FOREIGN PATENT DOCUMENTS

KR 10-1999-0053811 A 7/1999
KR 10-2001-0028263 A 4/2001

(Continued)

OTHER PUBLICATIONS

KR Office Action dated Jun. 5, 2024 issued in corresponding Korean Patent Application No. 10-2022-0188026, pp. 1-14, with English translation.

*Primary Examiner* — Jethro M. Pence

(74) *Attorney, Agent, or Firm* — Carter, DeLuca & Farrell LLP

(57) ABSTRACT

The present disclosure provides an apparatus for supplying chemicals, and an apparatus and a method for treating a substrate. An apparatus for supplying chemicals, according to an embodiment of the present disclosure, includes a storage tank storing the chemicals; a chemical discharge line discharging the chemicals from the storage tank; a circulation line connected to the storage tank and self-circulating the chemicals from the storage tank; a leak determining line connected to the circulation line and supplying gas to the circulation line; and a measurement unit measuring a change in pressure of the gas supplied to the circulation line.

17 Claims, 7 Drawing Sheets

(56) References Cited

U.S. PATENT DOCUMENTS

| | | | | |
|---|---|---|---|---|
| 6,464,788 | B2 * | 10/2002 | Falck | B05C 11/1039 118/264 |
| 6,604,555 | B2 * | 8/2003 | Blatt | F17C 5/00 141/1 |
| 6,607,104 | B2 * | 8/2003 | McGuffey | B05C 11/1044 222/318 |
| 8,544,495 | B1 * | 10/2013 | Weingart | A01C 23/042 422/264 |
| 9,186,450 | B2 * | 11/2015 | Fava | A61M 1/3649 |
| 9,488,087 | B2 * | 11/2016 | Mergner | B05C 3/109 |
| 9,962,722 | B1 * | 5/2018 | Sute | B05C 11/1044 |
| 10,124,365 | B2 * | 11/2018 | Hoedl | B05C 1/0826 |
| 10,173,659 | B2 * | 1/2019 | Kim | B60T 8/4081 |
| 11,033,925 | B2 * | 6/2021 | Juvert Vila | B05C 11/1039 |
| 11,273,461 | B2 * | 3/2022 | Schären | B05C 11/1013 |
| 11,538,665 | B2 * | 12/2022 | Sawachi | H01J 37/3244 |
| 12,024,776 | B2 * | 7/2024 | Obata | C23C 16/45563 |
| 12,272,544 | B2 * | 4/2025 | Ha | H01L 21/6715 |
| 2013/0048609 | A1 * | 2/2013 | Ito | B08B 3/08 118/712 |
| 2013/0220478 | A1 | 8/2013 | Kasahara et al. | |
| 2013/0224956 | A1 | 8/2013 | Negoro et al. | |
| 2014/0290698 | A1 | 10/2014 | Yun et al. | |
| 2016/0125965 | A1 * | 5/2016 | Mikami | F28B 11/00 60/660 |
| 2018/0180509 | A1 | 6/2018 | Sawachi | |
| 2019/0263693 | A1 * | 8/2019 | Arslan | C02F 1/444 |
| 2022/0208562 | A1 * | 6/2022 | Park | H01L 21/67017 |
| 2022/0208568 | A1 | 6/2022 | Ha | |
| 2023/0110526 | A1 * | 4/2023 | Nandi | A61B 6/48 600/1 |
| 2023/0145115 | A1 * | 5/2023 | Cornelis | F25B 30/02 62/204 |
| 2023/0184574 | A1 * | 6/2023 | Yun | G01F 23/02 118/712 |
| 2023/0221204 | A1 * | 7/2023 | Nakagawa | G01M 3/20 73/40 |
| 2023/0264225 | A1 * | 8/2023 | Matsunaga | B05C 5/00 |
| 2023/0369074 | A1 * | 11/2023 | Choi | H01L 21/67017 |

FOREIGN PATENT DOCUMENTS

| | | | |
|---|---|---|---|
| KR | 10-2013-0097650 | A | 9/2013 |
| KR | 10-2013-0099871 | A | 9/2013 |
| KR | 10-2014-0120232 | A | 10/2014 |
| KR | 20-2016-0002378 | U | 7/2016 |
| KR | 10-2018-0030478 | A | 3/2018 |
| KR | 10-2022-0093570 | A | 7/2022 |

* cited by examiner

APPARATUS FOR SUPPLYING CHEMICALS, APPARATUS AND METHOD FOR TREATING SUBSTRATE

CROSS-REFERENCE TO RELATED APPLICATION(S)

This application claims benefit of priority to Korean Patent Application No. 10-2022-0188026 filed on Dec. 28, 2022 in the Korean Intellectual Property Office, the disclosure of which is incorporated herein by reference in its entirety.

BACKGROUND

1. Field

The present disclosure relates to an apparatus for supplying chemicals, and an apparatus and a method for treating a substrate.

2. Description of Related Art

In general, a substrate may be manufactured by a deposition process, an etching process, a photo process, a cleaning process, and the like in a semiconductor manufacturing process. In the course of the semiconductor manufacturing process, various chemicals may be supplied to the substrate using an apparatus for supplying chemicals, to process the substrate. Such an apparatus may include a tank for storing the chemicals. When the chemicals are not supplied to the substrate, a circulation line may be provided to maintain states of the chemicals to prevent contamination, or to self-circulate the tank to meet substrate treatment conditions by adjusting states of the chemicals such as a temperature, a concentration, a composition, or the like of the chemicals required. In such a circulation line, components having various functions may be arranged, as necessary. In order to determine whether there is a leak in the circulation line, the chemicals such as deionized water or the like may be circulated through the circulation line, to determine whether or not a leak has occurred in the circulation line with the naked eye or through a leak detector. Due to this, when the leak occurs, a lot of man-hours may be required because an operator has to clean leaked deionized water or the like. Furthermore, after performing leak determining by circulating deionized water in the circulation line, since a flushing operation should be performed with the chemicals such as deionized water or the like remaining in a storage tank and the circulation line, as chemicals to be supplied to the substrate, there may be problems that take a lot of time periods to perform a leak determining operation.

(Patent Document 1) Korea Patent Publication No. 10-2014-0120232

SUMMARY

An aspect of the present disclosure is to provide an apparatus for supplying chemicals, and an apparatus and a method for treating a substrate, capable of efficiently determining a leak in a circulation line circulating chemicals from a tank, in order to solve the above problems.

According to an aspect of the present disclosure, an apparatus for supplying chemicals, includes a storage tank storing the chemicals; a chemical discharge line discharging the chemicals from the storage tank; a circulation line connected to the storage tank and self-circulating the chemicals from the storage tank; a leak determining line connected to the circulation line and supplying gas to the circulation line; and a measurement unit measuring a change in pressure of the gas supplied to the circulation line.

The apparatus may further include a gas supply line supplying the gas to the storage tank, wherein the leak determining line may be branched from the gas supply line.

The gas supply line may supply an inert gas.

At least one of a circulation pump pumping the chemicals, a heater heating the chemicals, or a filter filtering the chemicals may be disposed in the circulation line.

A heater heating the chemicals and a temperature sensor measuring temperatures of the chemicals may be disposed in the circulation line.

A filter filtering the chemicals may be disposed in the circulation line, and the circulation line may include filter bypass lines connected to an upstream side and a downstream side of the filter and configured to selectively allow the chemicals to bypass the filter.

The apparatus may further include an adjustment valve unit including a first adjustment valve disposed on a storage tank outlet side of the circulation line, which is an upstream side of a connection point between the circulation line and the leak determining line, and a second adjustment valve disposed on a storage tank inlet side of the circulation line; and a controller connected to the first adjustment valve, the second adjustment valve, the leak determining line, and the measurement unit.

A circulation pump pumping the chemicals in the circulation line between a downstream side of the first adjustment valve and an upstream side of the second adjustment valve may be disposed in the circulation line.

At least one of a filter filtering the chemicals, a heater heating the chemicals, a temperature sensor measuring temperatures of the chemicals, or a concentration measuring unit measuring concentrations of the chemicals may be disposed in the circulation line between a downstream side of the first adjustment valve and an upstream side of the second adjustment valve.

A drain line discharging the chemicals externally may be connected to at least one of the first adjustment valve or the second adjustment valve.

The apparatus may further include a gas supply line connected to the storage tank, and supplying gas pressurizing an internal space of the storage tank, to supply the chemicals in the storage tank to the chemical discharge line, wherein the leak determining line may be branched from the gas supply line.

The chemical discharge line may be connected to the circulation line, and the apparatus may further include a control valve opening and closing a flow path of the chemical discharge line.

The measurement unit may be disposed in the leak determining line.

The apparatus may include a plurality of storage tanks connected to each other, wherein the chemical discharge line may be connected to one of the plurality of storage tanks, and the circulation line, the leak determining line, and the measurement unit may be connected to each of the plurality of storage tanks.

According to an aspect of the present disclosure, an apparatus for treating a substrate, includes a processing chamber; a substrate processing unit disposed in the processing chamber, supporting the substrate, and processing the substrate; a supply line including a chemical discharge line discharging chemicals to the substrate; a storage tank disposed in the supply line and storing the chemicals; a circulation line connected to the storage tank and self-circulating the chemicals from the storage tank; a circulation pump disposed on the circulation line and pumping the chemicals; a heater disposed on the circulation line and heating the chemicals; a gas supply line connected to the storage tank, and supplying an inert gas pressurizing an internal space of the storage tank, to supply the chemicals in the storage tank to the chemical discharge line; a leak determining line branched from the gas supply line, connected to the circulation line, and supplying the inert gas to the circulation line; an adjustment valve unit including a first adjustment valve disposed on a storage tank outlet side of the circulation line, which is an upstream side of a connection point between the circulation line and the leak determining line, a second adjustment valve disposed on a storage tank inlet side of the circulation line, and a gas supply valve opening and closing to selectively supply gas from the gas supply line to the storage tank or the leak determining line; a measurement unit measuring a change in pressure of the gas supplied to the circulation line; and a controller connected to the first adjustment valve, the second adjustment valve, the gas supply valve, and the measurement unit.

The adjustment valve unit may include a third adjustment valve disposed on the circulation line on a downstream side of the connection point between the circulation line and the leak determining line and an upstream side of the second adjustment valve, and wherein the circulation pump may be disposed on the circulation line between the downstream side of the connection point and the third adjustment valve.

A drain line discharging the chemicals externally may be connected to the first adjustment valve and the third adjustment valve.

A filter filtering the chemicals may be disposed on the circulation line, and the circulation line may include filter bypass lines connected to an upstream side and a downstream side of the filter and configured to selectively allow the chemicals to bypass the filter.

The substrate processing unit may be provided as a plurality of substrate processing units, wherein the supply line may include a plurality of chemical discharge lines connected to the circulation line and discharging the chemicals to the substrate of each of the plurality of substrate processing units, and a drain line may be connected to a downstream side of a point at which the plurality of chemical discharge lines are connected to the circulation line.

The gas supply line may supply $N_2$ gas.

According to an aspect of the present disclosure, a method for treating a substrate, include a circulation operation of self-circulating chemicals through a circulation line connected to a storage tank disposed in a supply line supplying the chemicals to the substrate; a leak determining operation of supplying gas to the circulation line through a leak determining line branched from a gas supply line connected to the storage tank, to measure a change in pressure of the gas, in a state in which a first adjustment valve disposed on a storage tank outlet side of the circulation line and a second adjustment valve disposed on a storage tank inlet side of the circulation line are closed; and a supply operation of supplying the gas pressurizing an internal space of the storage tank through the gas supply line, to supply the chemicals in the storage tank to the substrate.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
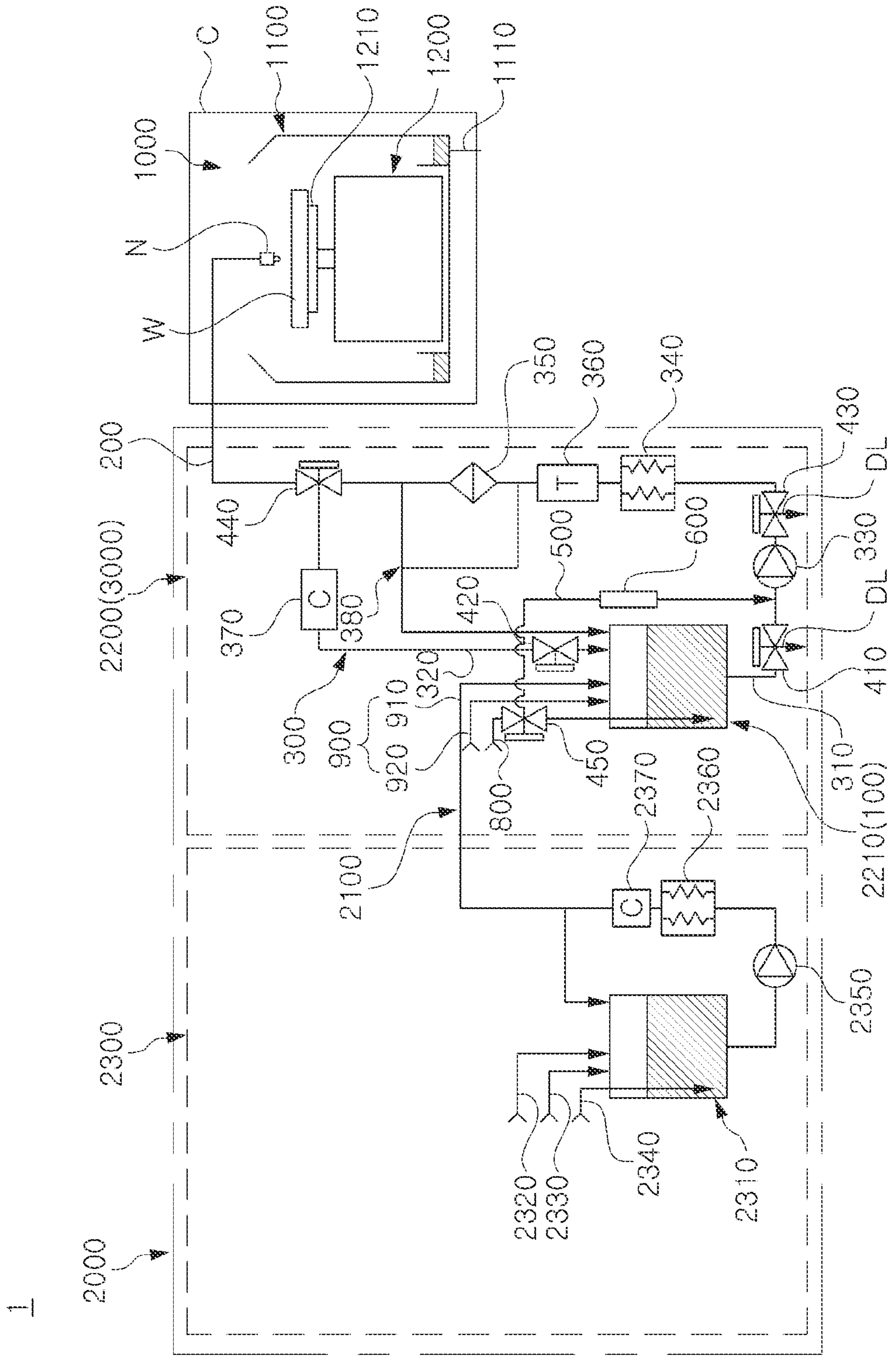
FIG. 1 is a view illustrating an apparatus for treating a substrate, according to a first embodiment of the present disclosure.

Hereinafter, with reference to the accompanying drawings, embodiments of the present disclosure will be described in detail such that those skilled in the art may easily carry out the present disclosure. The present disclosure may be embodied in many different forms, and is not limited to embodiments set forth herein.

In order to clearly describe the present disclosure, portions irrelevant to the description may be omitted, and the same reference numerals may be assigned to the same or similar components throughout the specification.

In addition, in various embodiments, components having the same configuration will be described only in representative embodiments using the same reference numerals, and in other embodiments, only configurations different from the representative embodiments will be described.

Throughout the specification, when a portion is said to be "connected (or coupled)" to a different portion, this may include not only a case in which it is "directly connected (or coupled)", but also a case in which it is "indirectly connected (or coupled)" with a different member interposed therebetween. In addition, when a portion "includes" or "comprises" a certain component, it means that a different component may be further included without excluding the different component, unless otherwise stated. In addition, the terms of "an upstream side," "an upstream end," "a downstream side," and "a downstream end," used throughout the specification may be based on a flow direction of fluid such as chemicals, gas, or the like, and, for example, a storage tank upstream side and a storage tank downstream side of a circulation line may be referred to as a storage tank upstream side of the circulation line connected to an upstream end of a storage tank in which fluid flows in, and a storage tank downstream side of the circulation line connected to a downstream end of the storage tank in which fluid flows out, based on a flow direction of fluid such as chemicals, gas, or the like.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless explicitly defined in the present disclosure, the terms should not be interpreted in an ideal or excessively formal meaning.

In the course of a semiconductor manufacturing process, an apparatus for treating a substrate may supply various chemicals to a substrate using an apparatus for supplying chemicals, to process the substrate. The apparatus for supplying chemicals in the apparatus for treating a substrate may include a tank for storing the chemicals. When the chemicals are not supplied to the substrate, a circulation line may be provided to maintain states of the chemicals to prevent contamination, or to self-circulate the tank to meet substrate treatment conditions by adjusting states of the chemicals such as a temperature, a concentration, a composition, or the like of the chemicals to be required.

An apparatus for treating a substrate according to the present disclosure may be an apparatus for processing a substrate using an apparatus for supplying chemicals including a storage tank equipped with such a circulation line, and may be used in various processes such as an etching process, a photo process, a cleaning process, and the like. For example, an apparatus for treating a substrate according to the present disclosure may be used in a cleaning process or an etching process, and specifically, chemicals such as an aqueous phosphoric acid solution as an etchant, or the like, to a surface of a substrate on which a silicon nitride film and a silicon oxide film are formed, and the silicon nitride film may be selectively removed. However, the present disclosure is not limited thereto, and may be used in a different substrate treatment processes such as a photo process in which a substrate is treated by supplying various chemicals to the substrate, or the like. Hereinafter, embodiments of the present disclosure will be described in detail with reference to the drawings.

First Embodiment

Figure 2:
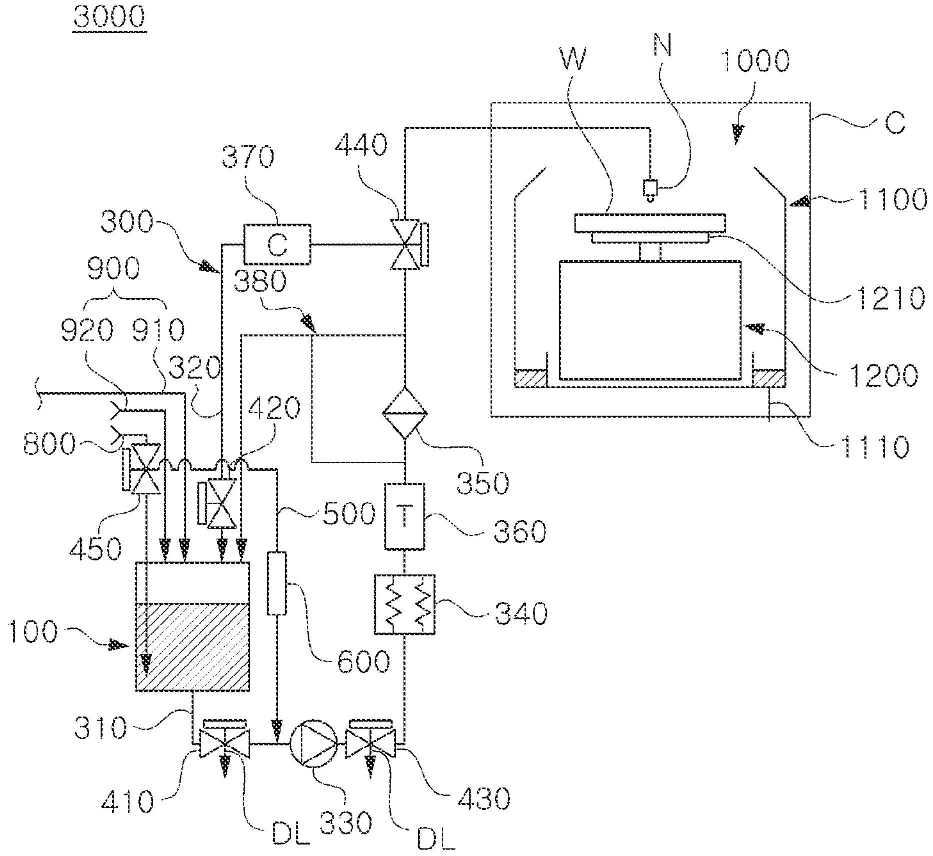
FIG. 2 is a view illustrating some configurations of an apparatus for treating a substrate, according to a first embodiment of the present disclosure.
Figure 3:
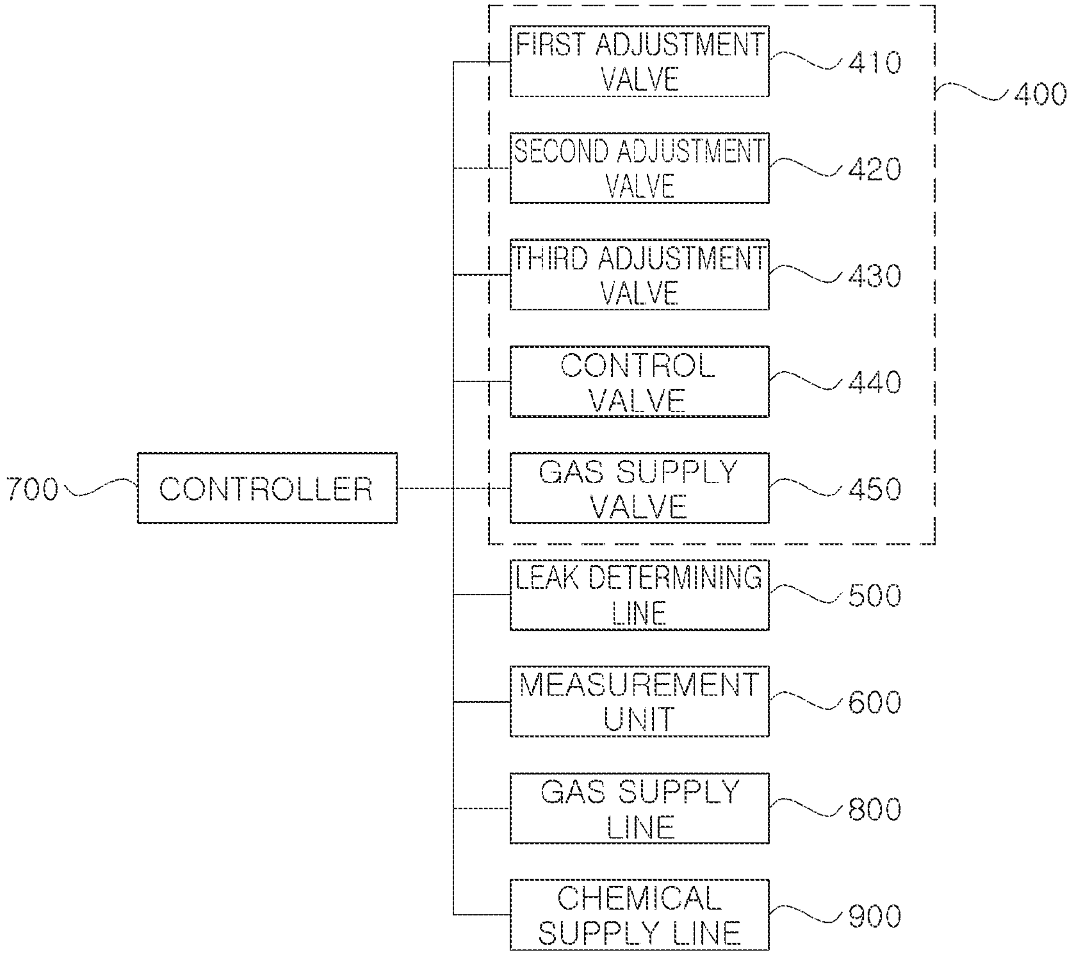
FIG. 3 is a view illustrating a connection relationship between a controller and each component in an apparatus for treating a substrate, according to a first embodiment of the present disclosure.
Figure 4:
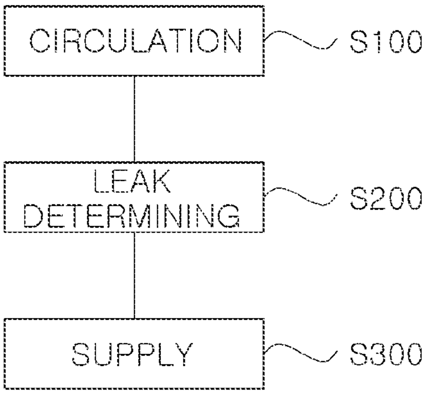
FIG. 4 is a view illustrating a method for treating a substrate using an apparatus for treating a substrate, according to a first embodiment of the present disclosure.

FIG. 1 is a view illustrating an apparatus for treating a substrate, according to a first embodiment of the present disclosure, and FIG. 2 is a view illustrating some configurations of an apparatus for treating a substrate, according to a first embodiment of the present disclosure. FIG. 3 is a view illustrating a connection relationship between a controller and each component in an apparatus for treating a substrate, according to a first embodiment of the present disclosure, and FIG. 4 is a view illustrating a method for treating a substrate using an apparatus for treating a substrate, according to a first embodiment of the present disclosure.

Referring to FIGS. 1 to 4, an apparatus 1 for treating a substrate according to a first embodiment of the present disclosure may include a processing chamber C, a substrate processing unit 1000, and a supply unit 2000.

The processing chamber C may be a chamber in which a process for treating a substrate W is performed using a treatment liquid such as a chemical liquid or the like. In such a processing chamber C, the substrate processing unit 1000 may be disposed to perform a treatment process on the substrate W in a rotating state while keeping the substrate W horizontally by the substrate processing unit 1000. The treatment process may be a cleaning process of cleaning contaminants or the like on the substrate W, an etching process of etching a film formed on the substrate W, or the like. However, the treatment process performed in the processing chamber C in the present disclosure is not limited thereto, and may be applied to other processes such as a photo process capable of treating the substrate using chemicals, or the like.

The substrate processing unit 1000 may be a component disposed in the processing chamber C and treating the substrate W using the chemicals supplied to the substrate W from the supply unit 2000. The substrate processing unit 1000 may include a bowl 1100 provided with a space for treating the substrate W therein, and a substrate support member 1200 disposed in the bowl 1100 to support the substrate W.

When the chemicals are discharged to the substrate W using the supply unit 2000, the bowl 1100 may receive the chemicals scattered from the substrate W and recover the same through a chemical recovery line 1110 of the bowl 1100.

The substrate support member 1200 may include a support chuck 1210 that supports the substrate W in a rotatable and vertical movement in the bowl 1100, and a driver (not illustrated) that drives the support chuck 1210. Therefore, during substrate treatment, the substrate W may be treated by supplying the chemicals to the substrate W through the supply unit 2000 while the substrate W is rotationally supported by the support chuck 1210.

The supply unit 2000 may include a supply line 2100, a main supply unit 2200, and an adjustment supply unit 2300. The main supply unit 2200 may be disposed in the supply line 2100, and may supply chemicals required for substrate processing to the substrate W disposed in the substrate processing unit 1000. The main supply unit 2200 may include a main tank 2210 storing the chemicals. The adjustment supply unit 2300 may adjust the chemicals according to substrate processing conditions, and may provide the adjusted chemicals to the main supply unit 2200. The adjustment supply unit 2300 may include an adjustment tank 2310 storing the chemicals. The adjustment supply unit 2300 may include a first fluid supply line 2320 supplying chemicals such as phosphoric acid or the like, a second fluid supply line 2330 supplying chemicals such as deionized water or the like, and a gas pressurization line 2340 pressurizing gas. The adjustment supply unit 2300 may also include a pump 2350, a heater 2360, and a concentration meter 2370. Therefore, the adjustment supply unit 2300 may self-circulate chemicals stored in the adjustment tank 2310, and may supply a treatment liquid such as phosphoric acid, deionized water, or the like through the first and second fluid supply lines 2320 and 2330, based on the substrate processing conditions, or may heat the chemicals to adjust conditions such as concentrations, temperatures, or the like of the chemicals, to supply the adjusted chemicals to the main tank 2210 of the main supply unit 2200.

FIG. 1 shows a structure in which an apparatus 3000 for supplying chemicals according to the first embodiment of the present disclosure is applied to the main supply unit 2200, but the present disclosure is not limited thereto, and may be applied to the adjustment supply unit 2300 in the same manner.

The apparatus 3000 according to the first embodiment of the present disclosure may include a storage tank 100, a chemical discharge line 200, a circulation line 300, an adjustment valve unit 400, a leak determining line 500, a measurement unit 600, and a controller 700.

The storage tank 100 may be a tank storing chemicals. In this case, the storage tank 100 may be applied as the main tank 2210 described above. For example, the storage tank 100 may be disposed in the supply line 2100 of the supply unit 2000, and may be applied as the main tank 2210 for storing the chemicals. The storage tank 100 may mix and store various chemicals or treatment gas according to treatment processes. To this end, a fluid supply line for supplying necessary chemicals, gas, or the like may be connected to the storage tank 100. As illustrated in FIGS. 1 and 2, a chemical supply line 900 supplying the chemicals may be connected to the storage tank 100. In this case, the chemical supply line 900 may be a supply line supplying various chemicals according to treatment process. For example, to clean or etch the substrate in a cleaning or etching process, the chemical supply line 900 may be connected to the storage tank 100, and may include a first chemical supply line 910 supplying a first chemical such as phosphoric acid or the like, and a second chemical supply line 920 supplying a second chemical such as deionized water or the like. In addition, a gas supply line 800 supplying gas may be connected to the storage tank 100, and a detailed description thereof will be described later. In addition, although not illustrated, a drain line (not illustrated) may be connected to the storage tank, as needed.

The chemical discharge line 200 may be a line for discharging the chemicals in the storage tank 100. The chemical discharge line 200 may be a portion of the supply line 2100 of the supply unit 2000 described above. For example, the supply line 2100 of the supply unit 2000 may include the chemical discharge line 200. The chemical discharge line 200 may be connected to the circulation line 300 to be described later, or may be directly connected to the storage tank 100. In the first embodiment, the chemical discharge line 200 is illustrated to be connected to the circulation line 300. A discharge end of the chemical discharge line 200 may be connected to a supply nozzle N discharging the chemicals to the substrate W in the processing chamber C. For example, as illustrated in FIG. 1, the discharge end of the chemical discharge line 200 may be connected to the supply nozzle N discharging the chemicals to the substrate W supported by the substrate support member 1200 of the substrate processing unit 1000 in the processing chamber C. A control valve 440 of the adjustment valve unit 400 to be described later may be disposed in the chemical discharge line 200, to open and close a flow path of the chemical discharge line 200. In addition, various components, such as a heater, a filter, a pump, or the like, that perform other functions may be disposed in the chemical discharge line 200, as needed.

The circulation line 300 may be connected to the storage tank 100, and may be a line for self-circulating the chemicals in the storage tank 100. The circulation line 300 may include a storage tank outlet side 310 and a storage tank inlet side 320. The storage tank outlet side 310 of the circulation line 300 may be a line portion of the circulation line 300 connected to an outlet end of the storage tank 100. In this case, the storage tank outlet side 310 of the circulation line 300 may be located to be an upstream side of a connection point between the circulation line 300 and the leak determining line 500 to be described later. A first adjustment valve 410 of the adjustment valve unit 400 to be described later may be disposed on the storage tank outlet side 310 of the circulation line 300. In the circulation line 300, the storage tank inlet side 320 may be a line portion of the circulation line 300 connected to an inlet end of the storage tank 100. A second adjustment valve 420 of the adjustment valve unit 400 to be described later may be disposed on the storage tank inlet side 320 of the circulation line 300. Various components may be disposed in this circulation line 300, as needed. At least one of a circulation pump pumping the chemicals, a heater heating the chemicals, or a filter filtering the chemicals may be disposed in the circulation line 300. At least one of a filter filtering the chemicals, a heater heating the chemicals, a temperature sensor measuring temperatures of the chemicals, or a concentration measurement unit measuring concentrations of the chemicals may be disposed in the circulation line 300. As a specific example, as illustrated in FIGS. 1 and 2, a circulation pump 330 pumping the chemicals, a heater 340 heating the chemicals, and a filter 350 filtering the chemicals may be disposed in the circulation line 300 between a downstream side of the first adjustment valve 410 and an upstream side of the second adjustment valve 420 in the adjustment valve unit 400 to be described later. In addition to a configuration of a measurement unit measuring a pressure of gas, a temperature sensing unit 360 such as a temperature sensor measuring temperatures of the chemicals, or the like, and a concentration measurement unit 370 such as a densitometer measuring concentrations of the chemicals, or the like may be disposed as further measuring means. Therefore, the chemicals may be measured for concentrations thereof, may be heated, and may be filtered while the chemicals in the storage tank may be self-circulated through the circulation line, such that states of the chemicals may be adjusted to meet supply conditions. In addition, as necessary, the circulation line 300 may include filter bypass lines 380 connected to an upstream side and a downstream side of the filter 350 and configured to selectively allow the chemicals to bypass the filter 350. In addition, as necessary, the circulation line may include heater bypass lines (not illustrated) connected to an upstream end and a downstream end of the heater and configured to selectively allow the chemicals to bypass the heater 340. Therefore, in the process of self-circulating the storage tank 100 through the circulation line 300, the chemicals may selectively pass through the heater 340 or the filter 350 to treat the chemicals, as needed.

However, the present disclosure is not limited thereto, and other components may be additionally disposed, as needed, and one of the pump 330, the heater 340, or the filter 350 may be selectively disposed.

The adjustment valve unit 400 may include the first adjustment valve 410 and the second adjustment valve 420. The first adjustment valve 410 may be disposed on the storage tank outlet side 310 of the circulation line 300, to control opening or closing of flow of the chemicals from the storage tank 100 toward the storage tank outlet side 310 of the circulation line 300. The second adjustment valve 420 may be disposed on the storage tank inlet side 320 of the circulation line 300, to control opening or closing of flow of the chemicals from the storage tank inlet side 320 of the circulation line 300 toward the storage tank 100. A drain line discharging the chemicals externally may be connected to at least one of the first adjustment valve 410 or the second adjustment valve 420. For example, as illustrated in FIGS. 1 and 2, the first adjustment valve 410 may be connected to a drain line DL.

The adjustment valve unit 400 may further include a third adjustment valve 430. The third adjustment valve 430 may be disposed in the circulation line 300 on a downstream side of the connection point between the circulation line 300 and the leak determining line 500 and an upstream side of the second adjustment valve 420. In this case, the circulation pump 330 may be disposed in the circulation line 300 between the downstream side of the connection point between the circulation line 300 and the leak determining line 500 and the third adjustment valve 430. Multi-directional valves may be applied as the first adjustment valve 410, the second adjustment valve 420, or the third adjustment valve 430, according to required input and output, as needed. For example, as illustrated in FIGS. 1 and 2, each of the first adjustment valve 410 and the third adjustment valve 430 may be configured as a three-directional valve, and may be connected to the drain line DL for discharging the chemicals externally. Therefore, supply and discharge of the chemicals in the storage tank may be selectively performed. However, the present disclosure is not limited thereto, and as necessary, the first adjustment valve and the third adjustment valve may be configured as multi-directional valves such as four-directional or the like. In this case, the drain line may be connected to each of the valves, and a fluid supply line supplying chemicals or gas may be connected. Therefore, supply and discharge of fluid such as chemicals, gas, or the like, supply and discharge of chemicals in the storage tank, or the like may be selectively performed.

Although not illustrated in FIGS. 1 and 2, the drain line DL may be connected to the second adjustment valve 420, as needed, or may be directly connected to the storage tank 100.

In addition, the adjustment valve unit 400 may include the control valve 440 opening or closing a flow path of the chemical discharge line 200 to open or close the flow path of the chemical discharge line 200, to selectively discharge the chemicals in the storage tank 100.

The leak determining line 500 may be connected to the circulation line 300, and may be a line supplying gas to the circulation line 300. Specifically, the leak determining line 500 may supply gas to the circulation line 300, and may use the measurement unit 600 to determine whether or not the gas leaks into the circulation line 300 with regard to the circulation line 300, to perform a leak determine function capable of determining whether or not there is a leak during circulation of the chemicals.

The measurement unit 600 may be configured to measure a change in pressure of gas supplied to the circulation line 300. This measurement unit 600 may be configured as various forms. For example, the measurement unit 600 may be a flow meter measuring a change in pressure of gas supplied to the circulation line 300 through the leak determining line 500. As a specific example, as illustrated in FIGS. 1 and 2, the measurement unit 600 may be a flow meter disposed in the leak determining line 500. However, the measurement unit 600 is not limited thereto, and may be implemented as other forms, and may be a pressure sensor measuring a change in pressure of gas as another example.

The controller 700 may be connected to the adjustment valve unit 400. Specifically, the controller 700 may be connected to the first adjustment valve 410, the second adjustment valve 420, the leak determining line 500, and the measurement unit 600, and may have a configuration for controlling an operation of the first adjustment valve 410, an operation of the second adjustment valve 420, an operation of the leak determining line 500, and an operation of the measurement unit 600. Specifically, when the controller 700 needs to determine whether the circulation line 300 leaks before discharging the chemicals from the storage tank 100 through the chemical discharge line 200 or as needed, the controller 700 may first discharge the chemicals remaining in the circulation line 300 externally. After discharging the chemicals of the circulation line 300 externally, the controller 700 may supply gas to the circulation line 300 through the leak determining line 500, in a state in which connection between the circulation line 300 and the storage tank 100 is blocked by closing the first adjustment valve 410 and the second adjustment valve 420 to determine a change in pressure of the gas in the circulation line 300. In this case, the controller 700 may determine whether or not the circulation line 300 leaks according to a change in pressure of the gas in the circulation line 300 measured by the measurement unit 600. For example, since the controller 700 may determine that there is no leak in the circulation line 300 when a pressure of the gas in the circulation line 300 is measured by the measurement unit 600 to a certain value or more, may determine that there is leakage in the circulation line 300 when a pressure of the gas in the circulation line 300 is measured by the measurement unit 600 to a certain value or less, and may take follow-up measures such as repair, replacement, or the like, occurrence of leakage of the chemicals in the circulation line 300 may be prevented in advance. The leak of the circulation line 300 may be efficiently checked according to a change in pressure of gas by supplying the gas to the circulation line 300 through the leak determining line 500. In addition, the apparatus 1 using the apparatus 3000 of the present disclosure may use gas to determine leak in the circulation line 300, to circulate deionized water in the circulation line in the prior art to perform the leak check. Since the chemicals to be supplied to the substrate may directly supply the chemicals without performing a flushing operation, an overall time period required for the leak determine of the circulation line 300 may be shortened, and furthermore, when the chemicals for the conventional leak determine are used, impact on subsequent processes may be minimized.

The controller 700 may be also connected to the storage tank 100, may be connected to the chemical supply line 900 for supplying the chemicals, and may control the supply of the chemicals through the chemical supply line 900 to the storage tank 100.

The controller 700 may further include an alarm unit (not illustrated) that notifies an alarm when pressure measured by the measurement unit 600 is a certain value or less. Therefore, since a quick follow-up action may be taken when a leak occurs in the circulation line, the apparatus 1 may be protected, and safety accidents may be effectively prevented.

Furthermore, the apparatus 3000 according to the first embodiment of the present disclosure may include the gas supply line 800 connected to the controller 700 and supplying gas to the storage tank 100. In this case, the controller 700 may be connected to the gas supply line 800, and may control gas supply of the gas supply line 800. The gas supply line 800 may supply gas into an internal space of the storage tank 100 to discharge the chemicals in the storage tank 100, to pressurize a surface of the chemicals and withdraw the chemicals to an outside of the storage tank 100. The gas supply line 800 may be connected to the storage tank 100, and may supply an inert gas that pressurizes the internal space of the storage tank 100, to supply the chemicals in the storage tank 100 to the chemical discharge line 200. In the first embodiment, the gas supply line 800 may supply $N_2$ gas. In this case, the leak determining line 500 may be branched from the gas supply line 800, and may be connected to the circulation line 300 to supply the inert gas such as $N_2$ gas or the like. In the first embodiment, the leak determining line 500 may be branched from the gas supply line 800, adjacent to the storage tank 100, and the $N_2$ gas of the gas supply line 800 may be passed through the leak determining line 500 through the circulation line 300. In this case, as illustrated in FIGS. 1 and 2, the adjustment valve unit 400 may include a gas supply valve 450. The gas supply valve 450 may be connected to the controller 700, and may be opened to selectively supply gas from the gas supply line 800 to the storage tank 100 or the leak determining line 500 by control of the controller 700. In this case, in FIGS. 1 and 2, the gas supply valve 450 may be configured as a three-directional valve, and may be implemented to open and close to selectively supply gas to the storage tank 100 or the leak determining line 500, but the present disclosure is not limited thereto, and supply of gas to the storage tank and the leak determining line may be individually controlled by disposing a gas supply valve on each of the gas supply line and the leak determining line.

Therefore, effects of compacting a structure of the apparatus 3000 and reducing manufacturing costs thereof may be implemented by supplying gas of the gas supply line 800 to the leak determining line 500 using the gas supply line 800 pressurizing the internal space of the storage tank 100, without need to additionally provide a connection line connected to a separate supply source for supplying gas to the leak determining line 500.

The present disclosure may provide a method for treating a substrate using the apparatus 1 including the apparatus 3000 according to the first embodiment.

In a method for treating a substrate according to an embodiment of the present disclosure, the substrate W may be treated using the apparatus 3000 of the apparatus 1 according to the first embodiment. In this case, the apparatus 3000 may include the storage tank 100, the chemical discharge line 200, the circulation line 300, the adjustment valve unit 400, the leak determining line 500, the measurement unit 600, the controller 700, the gas supply line 800, the chemical supply line 900, and the drain line DL, and detailed configurations related thereto will be omitted without redundant description.

A method for treating a substrate according to an embodiment of the present disclosure may include a circulation operation (S100), a leak determining operation (S200), and a supply operation (S300).

The circulation operation (S100) may be an operation of self-circulating chemicals through a circulation line 300 connected to a storage tank 100 disposed in a supply line 2100 supplying the chemicals to the substrate W. The circulation operation (S100) may be performed to control states of the chemicals to meet substrate processing conditions, and in an idle state in which the chemicals may not be discharged to the substrate W to prevent contamination or hardening of the chemicals, the circulation operation (S100) may be performed to maintain an optimized state of the chemicals.

The leak determining operation (S200) may be an operation of supplying gas to the circulation line 300 through a leak determining line 500 branched from a gas supply line 800 connected to the storage tank 100, to measure a change in pressure of the gas, in a state in which a first adjustment valve 410 disposed on a storage tank outlet side 310 of the circulation line 300 and a second adjustment valve 420 disposed on a storage tank inlet side 320 of the circulation line 300 are closed. In this case, the leak determining operation (S200) may be performed before discharging the chemicals from the storage tank 100 through the chemical discharge line 200 or when it is necessary to determine whether the circulation line 300 leaks or not as needed. In addition, before the leak determining line 500, the leak determining operation (S200) may be performed after first discharging the chemicals remaining in the circulation line 300 externally. In the leak determining operation (S200), a change in pressure of the gas in the circulation line 300 may be measured by the measurement unit 600, such as a flow meter disposed on the leak determining line 500, or the like. In this case, when the measured pressure is measured to have a certain value or more, it may be determined that there is no leak in the circulation line 300, and when a gas pressure in the circulation line 300 is measured to have a certain value or less, it may be determined that there is a leak in the circulation line 300.

In this case, the supply operation (S300) may be an operation of supplying the gas pressurizing an internal space of the storage tank 100 through the gas supply line 800, to supply the chemicals in the storage tank 100 to the substrate W. For example, when the gas pressure in the circulation line 300 measured in the leak determining operation (S200) is a certain value or more, and it is determined that there is no leak in the circulation line 300, the supply operation (S300) may be performed. When the gas pressure in the circulation line 300 measured in the leak determining operation (S200) is a certain value or less, and it is determined that there is a leak in the circulation line 300, since follow-up measures such as repair, replacement, or the like may be taken, occurrence of leakage of the chemicals in the circulation line 300 may be prevented in advance.

According to a method for treating a substrate according to an embodiment of the present disclosure, in the leak determining operation (S200) using gas, the gas may be supplied to the circulation line 300 through the leak determining line 500, and the circulation line 300 may be efficiently checked. In addition, when it is determined that there is no leak after performing the leak determining operation, since the supply operation (S300) of directly supplying the chemicals may be performed without need for a separate flushing operation, an overall time period required for the leak determine of the circulation line 300 may be shortened, and furthermore, when the chemicals for the conventional leak determine are used, impact on subsequent processes may be minimized.

Second Embodiment

Figure 5:
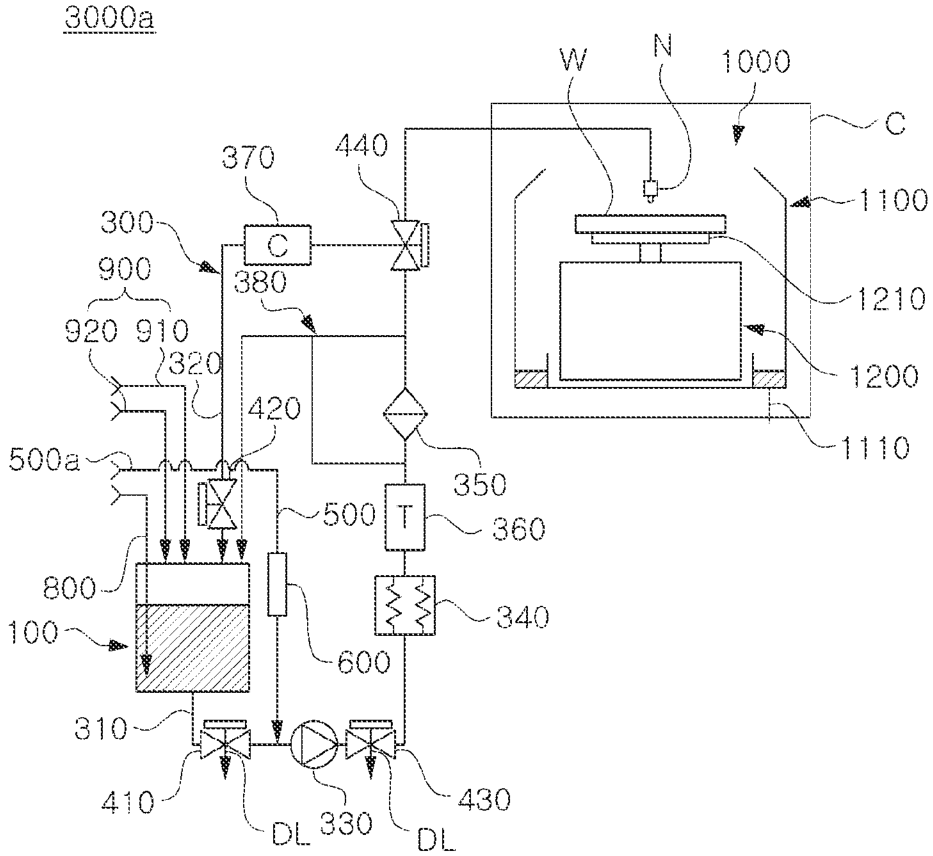
FIG. 5 is a view illustrating a structure having a separate gas supply line in an apparatus for treating a substrate, according to a second embodiment of the present disclosure.

FIG. 5 is a view illustrating a structure having a separate gas supply line in an apparatus for treating a substrate, according to a second embodiment of the present disclosure.

An apparatus for treating a substrate according to a second embodiment of the present disclosure will be described with reference to FIG. 5. The apparatus according to the second embodiment of the present disclosure may be applied in the same manner as configurations of the first embodiment, except that a leak determining line of an apparatus 3000*a* for supplying chemicals is directly connected to a supply source for supplying gas through the leak determining line without branching in a gas supply line, to directly supply the gas to the circulation line, and descriptions of the same configurations will be omitted to avoid duplication.

Referring to FIG. 5, in an apparatus 3000*a* for supplying chemicals of an apparatus for treating a substrate, according to the second embodiment of the present disclosure, a leak determining line 500*a* may be connected to a supply source supplying gas directly, without being branched from a gas supply line 800 pressurizing the gas into a storage tank 100, to supply the gas to a circulation line 300. In this case, the controller may be connected to the leak determining line 500*a* to control the supply of gas to the circulation line 300. The leak determining line 500*a* may supply an inert gas such as $N_2$ gas or the like to the circulation line 300. However, the present disclosure is not limited thereto, and the leak determining line 500*a* may supply other gases such as clean air or the like, as needed. In this case, the leak determining line 500*a* may supply the same gas as those of the gas supply line 800.

Third Embodiment

Figure 6:
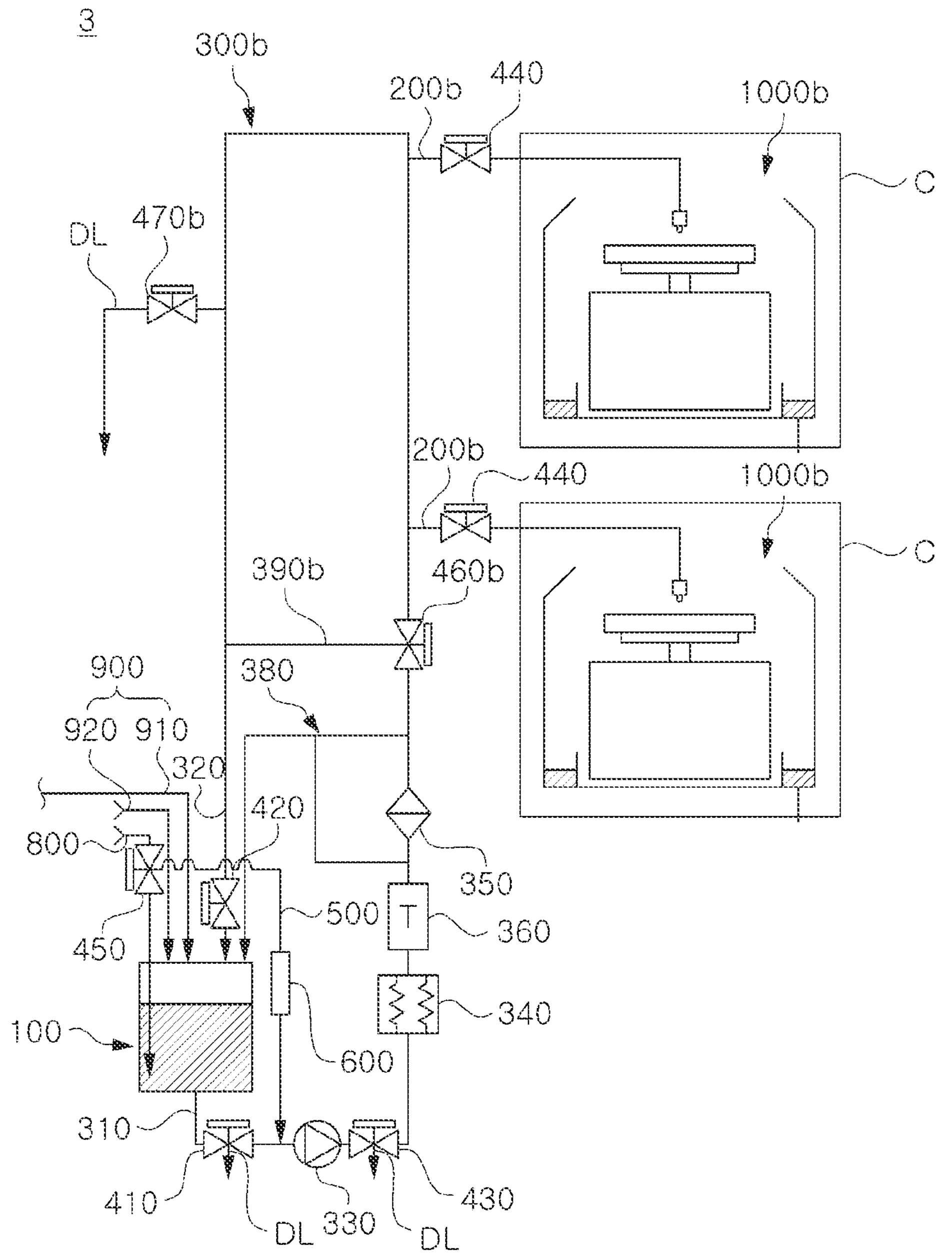
FIG. 6 is a view illustrating an apparatus for treating a substrate, according to a third embodiment of the present disclosure.

FIG. 6 is a view illustrating an apparatus for treating a substrate, according to a third embodiment of the present disclosure.

An apparatus 3 for treating a substrate according to a third embodiment of the present disclosure will be described with reference to FIG. 6. The apparatus 3 according to the third embodiment of the present disclosure may be applied in the same manner as configurations of the first embodiment, except that a plurality of substrate processing units are connected to a circulation line through a chemical discharge line and a drain line is additionally connected to the circulation line, and descriptions of the same configurations will be omitted to avoid duplication.

Referring to FIG. 6, in an apparatus 3 for treating a substrate of the present disclosure, a substrate processing unit 1000*b* may be configured as a plurality of substrate processing units. In this case, a supply line 2100 of a supply unit 2000 may be connected to a circulation line 300*b*, and may include a plurality of chemical discharge lines 200*b* discharging chemicals to a substrate W of each of the substrate processing units 1000*b*. In this case, a control valve 440 may be disposed in each of the chemical discharge lines 200*b*. In addition, the circulation line 300*b* may be branched on upstream sides of the plurality of chemical discharge lines 200*b*, may be connected to a storage tank inlet side 320, and may include a bypass line 390*b* bypassing the plurality of chemical discharge lines 200*b*. Furthermore, a bypass valve 460*b* may be disposed in the circulation line 300*b* to open and close a flow path of the bypass line 390*b*. The apparatus 3 including the plurality of substrate processing units 1000*b* may be used to efficiently process a plurality of substrates W at the same time. A drain line DL may be connected to a downstream side of a point at which the plurality of chemical discharge lines 200*b* are connected in the circulation line 300*b*. A drain valve 470*b* may be disposed on the drain line DL. Therefore, when the circulation line 300*b* needs to be cleaned using a cleaning liquid such as deionized water or the like, gas may be supplied to the circulation line 300*b* using a leak determining line 500 before cleaning. While this gas passes through the circulation line 300*b*, remaining chemicals in the circulation line 300*b* may be effectively and forcibly discharged externally through the drain line DL connected to the circulation line 300*b* on a downstream side of a point at which the plurality of chemical discharge lines 200*b* are connected. Therefore, an amount of the cleaning liquid used for cleaning the circulation line 300*b* may be reduced.

Fourth Embodiment

Figure 7:
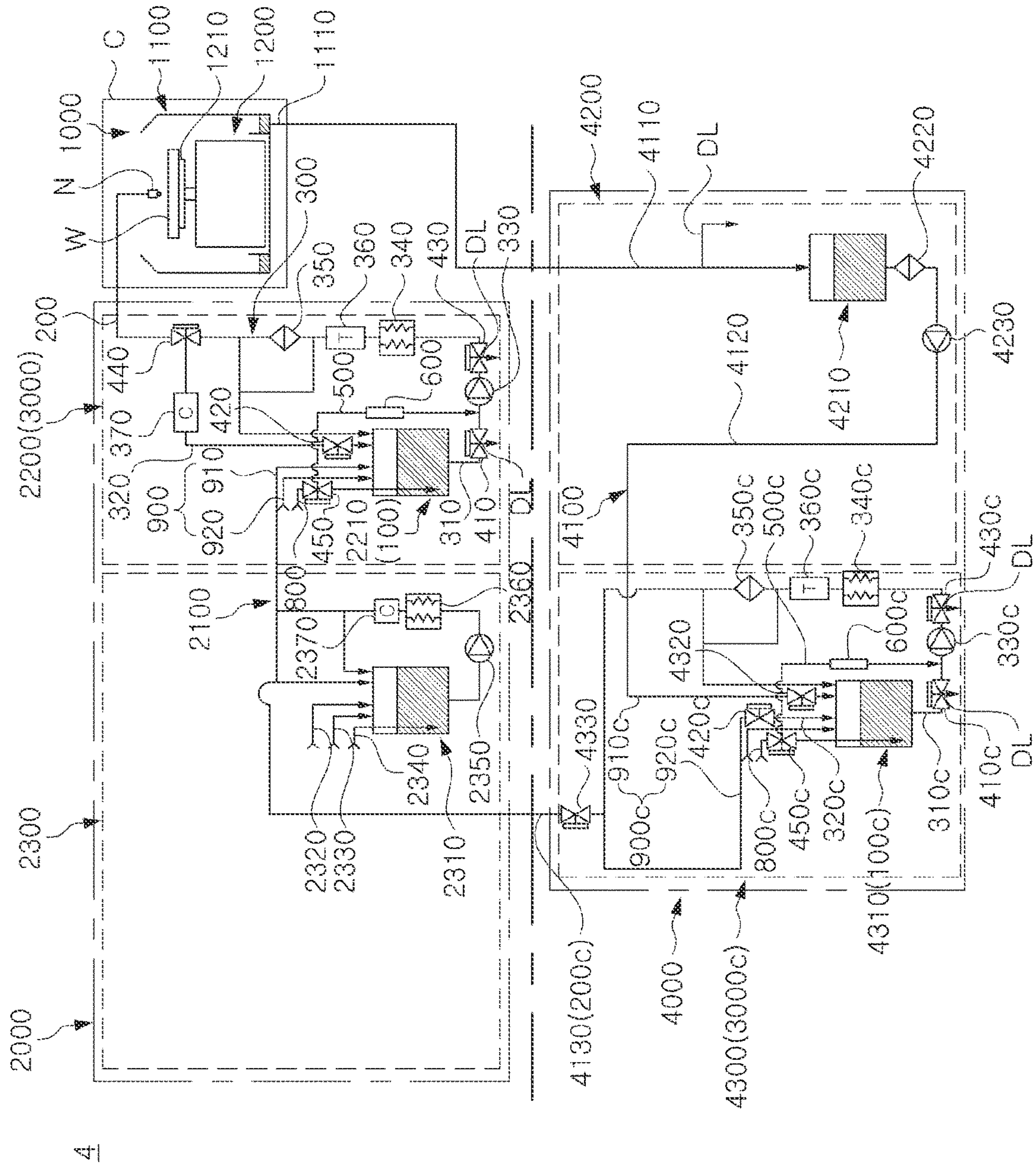
FIG. 7 is a view illustrating an apparatus for treating a substrate, according to a fourth embodiment of the present disclosure.

FIG. 7 is a view illustrating an apparatus for treating a substrate, according to a fourth embodiment of the present disclosure.

An apparatus 4 for treating a substrate according to a fourth embodiment of the present disclosure will be described with reference to FIG. 7. The apparatus 4 according to the fourth embodiment of the present disclosure may be applied in the same manner as configurations of the first embodiment, except for a recovery-regeneration unit, and descriptions of the same configurations will be omitted to avoid duplication.

The apparatus 4 according to the fourth embodiment of the present disclosure may include a processing chamber C, a substrate processing unit 1000, and a supply unit 2000. The substrate processing unit 1000 may include a bowl 1100 and a substrate support member 1200. The supply unit 2000 may include a supply line 2100, a main supply unit 2200, and an adjustment supply unit 2300. Configurations of the processing chamber C, the substrate processing unit 1000, and the supply unit 2000 including the supply line 2100, the main supply unit 2200, and the adjustment supply unit 2300 according to the fourth embodiment of the present disclosure may be applied in the same manner as configurations of the processing chamber C, the substrate processing unit 1000, and the supply unit 2000 including the supply line 2100, the main supply unit 2200, and the adjustment supply unit 2300, described in the first embodiment, and descriptions of the same configurations will be omitted to avoid duplication.

In addition, the apparatus 4 according to the fourth embodiment of the present disclosure may include a recovery-regeneration unit 4000 that recovers, regenerates, and recycles chemicals by which a substrate W is treated. For example, the recovery-regeneration unit 4000 may be connected to a chemical recovery line 1110 of the bowl 1100 of the substrate processing unit 1000, and may be recycled by recovering and regenerating the chemicals discharged from the bowl 1100, and supplying the regenerated chemicals to the supply unit 2000.

The recovery-regeneration unit 4000 may include a recovery-regeneration line 4100 connected to the bowl 1100 and the supply unit 2000 to recover, regenerate, and recycle the chemicals discharged from the bowl 1100. The recovery-regeneration line 4100 may recover and regenerate the chemicals supplied to the substrate W supported by the substrate support member 1200 through the supply unit 2000. To recycle the chemicals, the recovery-regeneration unit 4000 may include various components such as a filter filtering the chemicals, a pump pumping the chemicals, a tank storing the chemicals, a valve controlling flow of the chemicals of the recovery-regeneration line 4100, a heater heating the chemicals, or the like.

As a specific example, the recovery-regeneration unit 4000 may include a recovery unit 4200 and a regeneration unit 4300, disposed in the recovery-regeneration line 4100.

The recovery unit 4200 may recover the chemicals by which the substrate W is treated from the bowl 1100. In detail, the recovery unit 4200 may include a recovery tank 4210 that recovers and stores the chemicals by which the substrate W is treated from the bowl 1100.

The regeneration unit 4300 may regenerate the chemicals recovered through the recovery unit 4200, and may supply the same to the supply unit 2000. In detail, the regeneration unit 4300 may include a regeneration tank 4310 that regenerates the chemicals in the recovery tank 4210.

The recovery-regeneration line 4100 may include a recovery connection line 4110 connecting the chemical recovery line 1110 of the bowl 1100 and the recovery tank 4210, a regeneration connection line 4120 connecting the recovery tank 4210 and the regeneration tank 4310, and a supply connection line 4130 connecting the regeneration tank 4310, an adjustment tank 2310 of the adjustment supply unit 2300 of the supply unit 2000, and a main tank 2210 of the main supply unit 2200.

A drain line DL discharging the chemicals recovered from the bowl 1100 externally may be connected to the recovery connection line 4110. In addition, various components such as a filter or the like may be disposed in the recovery connection line 4110, as needed.

The regeneration connection line 4120 may include a first filter 4220 filtering the chemicals discharged from the recovery tank 4210, and a recovery pump 4230 discharging the chemicals stored in the recovery tank 4210 to the regeneration connection line 4120. In addition, a first supply adjustment valve 4320 may be disposed in the regeneration connection line 4120 to open or close a flow path of the regeneration connection line 4120, to supply the chemicals from the recovery tank 4210 to the regeneration tank 4310.

The supply connection line 4130 may be connected to the regeneration unit 4300, and a second supply adjustment valve 4330 opening or closing a flow path of the supply connection line 4130 may be disposed in the supply connection line 4130 to selectively supply the chemicals discharged from the regeneration tank 4310 to the adjustment tank 2310 of the adjustment supply unit 2300 of the supply unit 2000 or the main tank 2210 of the main supply unit 2200.

As illustrated in FIG. 7, the apparatus 3000 described in the first embodiment may be applied to the regeneration unit 4300 in the same manner as the main supply unit 2200. However, the present disclosure is not limited thereto, and may equally be applied to the recovery unit 4200.

For example, an apparatus 3000*c* for supplying chemicals may be applied to the regeneration unit 4300 in the same configuration as the apparatus 3000 of the main supply unit 2200. Specifically, the regeneration unit 4300 may include a storage tank 100*c* as the regeneration tank 4310, a chemical discharge line 200*c*, a circulation line 300*c*, an adjustment valve unit 400*c*, a leak determining line 500*c*, a measurement unit 600*c*, a controller 700*c*, a gas supply line 800*c*, and a chemical supply line 900*c*. For example, configurations of the storage tank 100*c* of the regeneration unit 4300, the chemical discharge line 200*c*, the circulation line 300*c*, the adjustment valve unit 400*c*, the leak determining line 500*c*, the measurement unit 600*c*, the controller 700*c*, the gas supply line 800*c*, and the chemical supply line 900*c* may be applied in the same manner as configurations of the storage tank 100, the chemical discharge line 200, the circulation line 300, the adjustment valve unit 400, the leak determining line 500, the measurement unit 600, the controller 700, the gas supply line 800, and the chemical supply line 900 in the first embodiment, and a detailed description thereof will be omitted. What needs to be explained herein may be that the chemical discharge line 200*c* of the regenerating unit 4300 may not directly supply the chemicals to the substrate W, but may selectively supply recycled chemicals to the adjustment tank 2310 of the adjustment supply unit 2300 and the main tank 2210 of the supply unit 2200 in the supply unit 2000. For example, the chemical discharge line 200*c* of the regeneration unit 4300 may be the supply connection line 4130 or a portion of the supply connection line 4130.

According to a configuration of the apparatus 4 according to the fourth embodiment, since the apparatuses 3000 and 3000*c* including the circulation line in which the leak determining line using gas is provided may be applied to the main supply unit 2200 of the supply unit 2000 and the regeneration unit 4300 of the recovery-regeneration unit 4000, to determine whether or not the circulation line leaks according to a change in gas pressure in the circulation line, follow-up measures such as repair, replacement, or the like may be taken in the main supply unit 2200 of the supply unit 2000 and the regeneration unit 4300 of the recovery-regeneration unit 4000. Therefore, occurrence of leakage of the chemicals in the circulation line may be prevented in advance. The leak of the circulation line of the main supply unit 2200 of the supply unit 2000 and the regeneration unit 4300 of the recovery-regeneration unit 4000 may be efficiently checked according to a change in pressure of gas by supplying the gas to the circulation line through the leak determining line. In addition, the apparatus 4 using the apparatuses 3000 and 3000*c* of the present disclosure may use gas to determine leak in the circulation line, to circulate deionized water in the circulation line in the prior art to perform the leak check. Since the chemicals to be supplied to the substrate may directly supply the chemicals without performing a flushing operation, an overall time period required for the leak determine of the circulation line 300 may be shortened, and furthermore, when the chemicals for the conventional leak determine are used, impact on subsequent processes may be minimized.

Although the first to fourth embodiments have been described as examples above, the above embodiments may be combined with each other without departing from the technical spirit of the present disclosure, which will also fall within the scope of the present disclosure.

The present embodiment and the drawings accompanying this specification clearly represent only a portion of the technical idea included in the present disclosure, and may be easily inferred by those skilled in the art within the scope of the technical idea included in the specification and drawings of the present disclosure. It will be apparent that all possible modifications and specific embodiments may be included in the scope of the present disclosure.

Therefore, the spirit of the present disclosure should not be limited to the described embodiments, and it will be said that not only the claims to be described later, but also all modifications equivalent or equivalent to these claims belong to the scope of the present disclosure.

According to an apparatus for supplying chemicals, having the above configuration of the present disclosure, since a leak determining line supplying gas to a circulation line may be connected to efficiently determine whether or not the circulation line is leaked according to a change in pressure of the gas in the circulation line. Therefore, since subsequent measures such as repair, replacement, or the like of an apparatus for supplying chemicals and an apparatus for treating a substrate, may be taken, occurrence of leakage of the chemicals in the circulation line may be prevented in advance. In addition, an apparatus for treating a substrate using an apparatus for supplying chemicals, according to the present disclosure, may use gas for leak determine of a circulation line, to perform an operation of directly supplying chemicals, without circulating deionized water in a circulation line to perform leak determine and then performing a flushing operation with chemicals to be supplied to a substrate in the prior art. Therefore, an overall time period required for the leak determine of the circulation line may be shortened, and furthermore, impact on a subsequent process may be minimized when the chemicals are used for the conventional leak check.

While example embodiments have been illustrated and described above, it will be apparent to those skilled in the art that modifications and variations could be made without departing from the scope of the present disclosure as defined by the appended claims.

What is claimed is:

1. An apparatus for supplying chemicals, comprising:

a storage tank storing the chemicals;

a chemical discharge line discharging the chemicals from the storage tank;

a circulation line connected to the storage tank and self-circulating the chemicals from the storage tank;

a gas supply line supplying the gas to the storage tank;

a leak determining line branched from the gas supply line, connected to the circulation line and configured to supply a gas to the circulation line;

a measurement unit configured for measuring a change in pressure of the gas supplied to the circulation line; and a controller operatively connected to the first adjustment valve, the second adjustment valve, the leak determining line, and the measurement unit, wherein the controller is configured to:

close a first adjustment valve disposed on a storage tank outlet side of the circulation line and a second adjustment valve disposed on a storage tank inlet side of the circulation line to isolate the circulation line from the storage tank;

control supply of the gas to the circulation line through the leak determining line; and determine whether a leak is present based on a pressure decrease of the supplied gas measured by the measurement unit.

2. The apparatus of claim 1, wherein the gas supply line supplies an inert gas.

3. The apparatus of claim 1, wherein at least one of a circulation pump pumping the chemicals, a heater heating the chemicals, or a filter filtering the chemicals is disposed in the circulation line.

4. The apparatus of claim 1, wherein a heater heating the chemicals and a temperature sensor measuring temperatures of the chemicals are disposed in the circulation line.

5. The apparatus of claim 1, wherein a filter filtering the chemicals is disposed in the circulation line, and the circulation line comprises filter bypass lines connected to an upstream side and a downstream side of the filter and configured to selectively allow the chemicals to bypass the filter.

6. The apparatus of claim 1, wherein a circulation pump pumping the chemicals in the circulation line between a downstream side of the first adjustment valve and an upstream side of the second adjustment valve is disposed in the circulation line.

7. The apparatus of claim 1, wherein at least one of a filter filtering the chemicals, a heater heating the chemicals, a temperature sensor measuring temperatures of the chemicals, or a concentration measurement unit measuring concentrations of the chemicals is disposed in the circulation line between a downstream side of the first adjustment valve and an upstream side of the second adjustment valve.

8. The apparatus of claim 1, wherein a drain line discharging the chemicals externally is connected to at least one of the first adjustment valve or the second adjustment valve.

9. The apparatus of claim 1, further comprising a gas supply line connected to the storage tank, and supplying gas pressurizing an internal space of the storage tank, to supply the chemicals in the storage tank to the chemical discharge line, wherein the leak determining line is branched from the gas supply line.

10. The apparatus of claim 1, wherein the measurement unit is disposed in the leak determining line.

11. The apparatus of claim 1, wherein the storage tank is provided as a plurality of storage tanks connected to each other, wherein the chemical discharge line is connected to one of the plurality of storage tanks, and the circulation line, the leak determining line, and the measurement unit are connected to each of the plurality of storage tanks.

12. An apparatus for treating a substrate, comprising:

a processing chamber;

a substrate processing unit disposed in the processing chamber, supporting the substrate, and processing the substrate;

a supply line including a chemical discharge line discharging chemicals to the substrate;

a storage tank disposed in the supply line and storing the chemicals;

a circulation line connected to the storage tank and self-circulating the chemicals from the storage tank;

a circulation pump disposed on the circulation line and pumping the chemicals;

a heater disposed on the circulation line and heating the chemicals;

a gas supply line connected to the storage tank, and supplying an inert gas pressurizing an internal space of the storage tank, to supply the chemicals in the storage tank to the chemical discharge line;

a leak determining line branched from the gas supply line, connected to the circulation line, and supplying the inert gas to the circulation line;

an adjustment valve unit including a first adjustment valve disposed on a storage tank outlet side of the circulation line, which is an upstream side of a connection point between the circulation line and the leak determining line, a second adjustment valve disposed on a storage tank inlet side of the circulation line, and a gas supply valve opening and closing to selectively supply gas from the gas supply line to the storage tank or the leak determining line;

a measurement unit measuring a change in pressure of the gas supplied to the circulation line; and a controller connected to the first adjustment valve, the second adjustment valve, the gas supply valve, and the measurement unit, wherein the controller is configured to:

close the first adjustment valve and the second adjustment valve to isolate the circulation line from the storage tank;

control the gas supply valve to supply gas from the gas supply line to the circulation line through the leak determining line; and determine whether a leak is present based on a pressure decrease of the supplied gas measured by the measurement unit.

13. The apparatus of claim 12, wherein the adjustment valve unit comprises a third adjustment valve disposed in the circulation line on a downstream side of the connection point between the circulation line and the leak determining line and an upstream side of the second adjustment valve, and wherein the circulation pump is disposed on the circulation line between the downstream side of the connection point and the third adjustment valve.

14. The apparatus of claim 13, wherein a drain line discharging the chemicals externally is connected to the first adjustment valve and the third adjustment valve.

15. The apparatus of claim 12, wherein a filter filtering the chemicals is disposed in the circulation line, and the circulation line comprises filter bypass lines connected to an upstream side and a downstream side of the filter and configured to selectively allow the chemicals to bypass the filter.

16. The apparatus of claim 12, wherein the substrate processing unit is provided as a plurality of substrate processing units, wherein the supply line comprises a plurality of chemical discharge lines connected to the circulation line and discharging the chemicals to the substrate of each of the plurality of substrate processing units, and a drain line is connected to a downstream side of a point at which the plurality of chemical discharge lines are connected in the circulation line.

17. The apparatus of claim 12, wherein the gas supply line supplies $N_2$ gas.

* * * * *